(122.)
F. W TOWNROW.
Improvement in Car Wheels.
No. 122,340.            Patented Jan. 2, 1872.
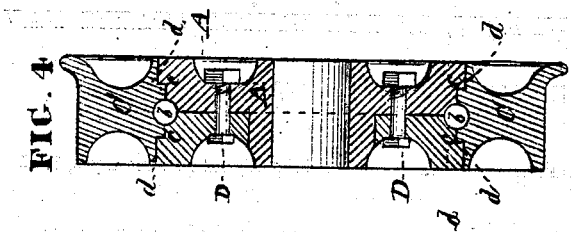
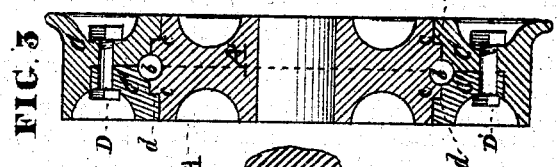
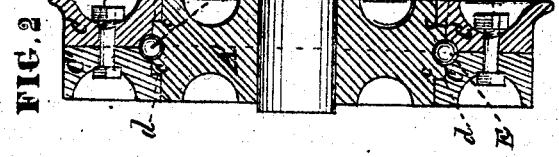
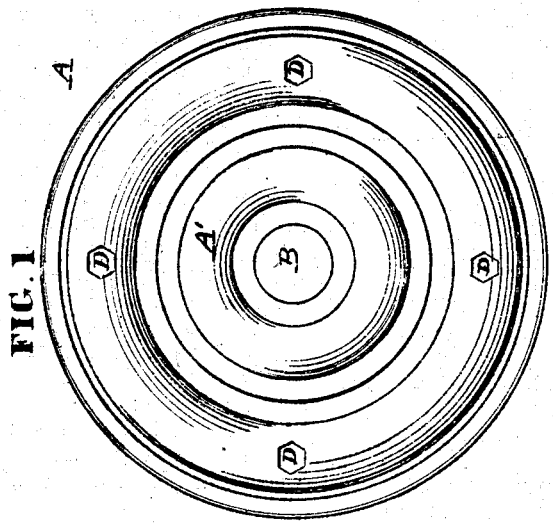
WITNESSES
Thomas J. Bewley.
Isaac Kindg
INVENTOR.
Frederick W Townrow
by his Attorney
Stephen Ustick
AM. PHOTO-LITHOGRAPHIC CO. N.Y. (OSBORNE'S PROCESS.)

122,340

UNITED STATES PATENT OFFICE.

FREDERICK W. TOWNROW, OF THE UNITED STATES NAVY.

IMPROVEMENT IN CAR-WHEELS.

Specification forming part of Letters Patent No. 122,340, dated January 2, 1872.

Specification describing certain Improvements in Car-Wheels, invented by FREDERICK W. TOWNROW, of the United States Navy.

The object of my invention is such a construction of one of the wheels on each axle as will admit of its revolving independent of the other, in accommodation to turning curves, and at the same time be simple and free from the objections which the various modes hitherto invented have been subject to.

The nature of my invention consists in an annular groove, one-half of which is formed in the outer periphery of a hub or inner section of the wheel, and the other half in the inner periphery of the rim portion, and the combination with said groove of spherical metallic balls, which receive the weight which comes upon the wheels, the balls revolving in the groove when there is an unequal velocity between the tread of the rim and that of the permanent wheel on the other end of the axle in turning curves, thus relieving the axle of the torsion which results from turning curves when both wheels are fast on the axle, and the consequent wear and tear on the track.

To provide for the insertion of the balls in the combined groove I form the rim of the wheel in two pieces, as hereinafter described, and confine them together by means of screw-bolts, or else make the division in the hub. In the former case the division may be made only at the internal part of the rim, having the tread all in one piece. And in the latter case a rim may only separate at the periphery of the hub or wheel, leaving the central part whole.

Figure 1 represents a side view of the improved wheel A, connected with the axle B. Fig. 2 is a section at the line $a\,b$ of Fig. 1. Figs. 3 and 4 represent modifications in the mode of putting the wheel together.

Like letters in all the figures indicate the same parts.

A′ represents the hub of the improved wheel, and B a portion of the axle, with which it is permanently connected. C and C′ are the inner and outer halves of the outer portion of the wheel, having a tread, $a$, of the usual construction. A half-circular groove is formed in the periphery of the hub A′, and a like groove in the inner edge of the combined rim C and C′, so that when the groove in the combined rim and the groove in the hub are brought together an annular channel, $b$, of circular form is produced, a cross-section of which is seen in Figs. 3 and 4. The periphery of the hub A′ is provided with rabbets, $c\,c$, which fit corresponding rabbets $d\,d$ of the rim C and C′, so that the hub and rim shall be held securely in their lateral position when the halves C C′ are confined together by means of the screw-bolts D. A series of metallic balls, E, are inserted, as seen in Fig. 2, in the channel which receives the weight which comes upon the wheel, allowing the hub to have a partial turn in the rim when the velocity of the tread of the wheel is unequal to that of the permanent wheel on the other end of the shaft as the car passes over curves or moves out of a straight line, thus relieving the axle of all torsional strain incidental to the unequal velocity of the wheels, and preventing the wear of the track incidental to the rubbing of the wheels when moving at unequal velocities. For the sake of simplicity the balls and annular channel may be omitted. Yet I prefer using them on account of getting rid of friction which would otherwise occur. Instead of making the separation in the rim through the tread, it may extend only part way of the rim, leaving the tread whole, as represented in Fig. 3. Or it may be made in the hub, as represented in the cross-section, Fig. 4, if desired.

I claim as my invention—

The annular channel $b$, of circular form in its cross-section, one-half of which is in the outer periphery of the hub or central part of the wheel and the other half in the inner periphery of the rim section, in combination with the spherical metallic balls E, substantially as and for the purpose set forth.

FREDERICK W. TOWNROW.

Witnesses:
THOMAS J. BEWLEY,
STEPHEN USTICK.

(122)